A. GIVEN.
PROCESS AND APPARATUS FOR EXTRACTING SULPHUR FROM SPENT OXIDE FROM GAS WORKS.
APPLICATION FILED SEPT. 27, 1918.

1,404,199.

Patented Jan. 24, 1922.
2 SHEETS—SHEET 1.

INVENTOR
Arthur Given
BY Townsend & Decker
ATTORNEYS

A. GIVEN.
PROCESS AND APPARATUS FOR EXTRACTING SULPHUR FROM SPENT OXIDE FROM GAS WORKS.
APPLICATION FILED SEPT. 27, 1918.
1,404,199.
Patented Jan. 24, 1922.
2 SHEETS—SHEET 2.
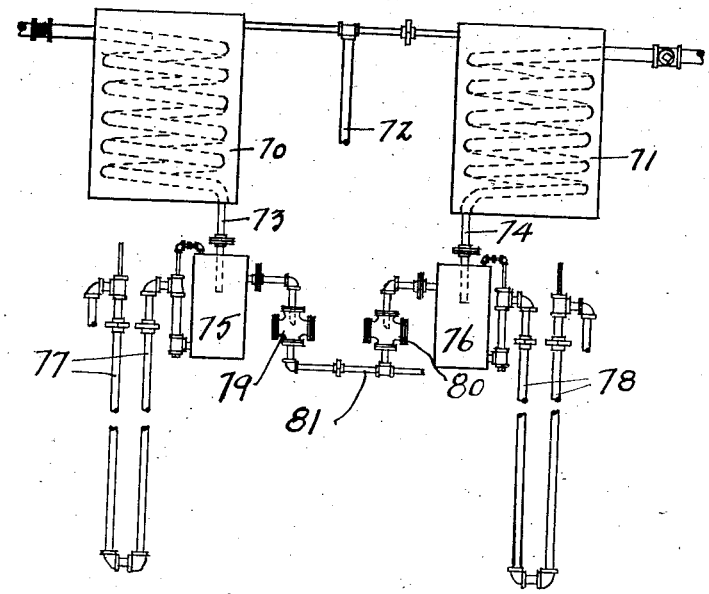
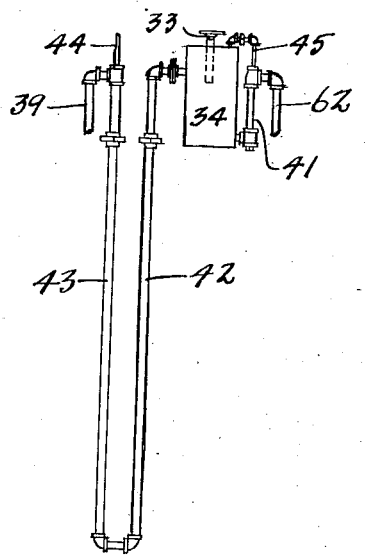
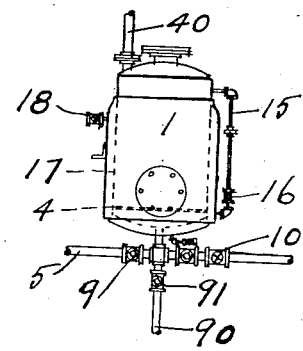
INVENTOR
Arthur Given
BY Townsend + Decker
ATTORNEYS

UNITED STATES PATENT OFFICE.

ARTHUR GIVEN, OF NEWARK, NEW JERSEY, ASSIGNOR TO STEVENS-AYLSWORTH COMPANY, OF NEW YORK, N. Y., A CORPORATION OF NEW YORK.

PROCESS AND APPARATUS FOR EXTRACTING SULPHUR FROM SPENT OXIDE FROM GAS WORKS.

1,404,199.  Specification of Letters Patent.  Patented Jan. 24, 1922.

Application filed September 27, 1918. Serial No. 255,970.

*To all whom it may concern:*

Be it known that I, ARTHUR GIVEN, a citizen of the United States, and a resident of Newark, in the county of Essex and State of New Jersey, have invented certain new and useful Improvements in Processes and Apparatus for Extracting Sulphur from Spent Oxide from Gas Works, of which the following is a specification.

My invention has for its object the production of an apparatus by means of which sulphur may be inexpensively and expeditiously extracted from spent oxides from gas works without waste of the solvent employed for the purpose of extraction and also has for its object the extraction of the sulphur by an improved and novel method or process by means of which the extraction is accomplished more quickly, thoroughly and at less cost than other methods or processes of which I have knowledge.

To the above ends my invention consists in the novel parts and combinations of parts and the novel process hereinafter more particularly described and then specified in the claims.

In the accompanying drawings illustrating my invention:

Fig. 2 is a slight modification of a portion of the apparatus showing the use of two condensers.

Fig. 3 is a modification of a portion of the apparatus which is employed when the carbon bisulphide is used as the solvent.

Fig. 4 is a modification of the parts adjacent the extractor tank for holding the oxides from which the sulphur is to be extracted.

Figure 1:
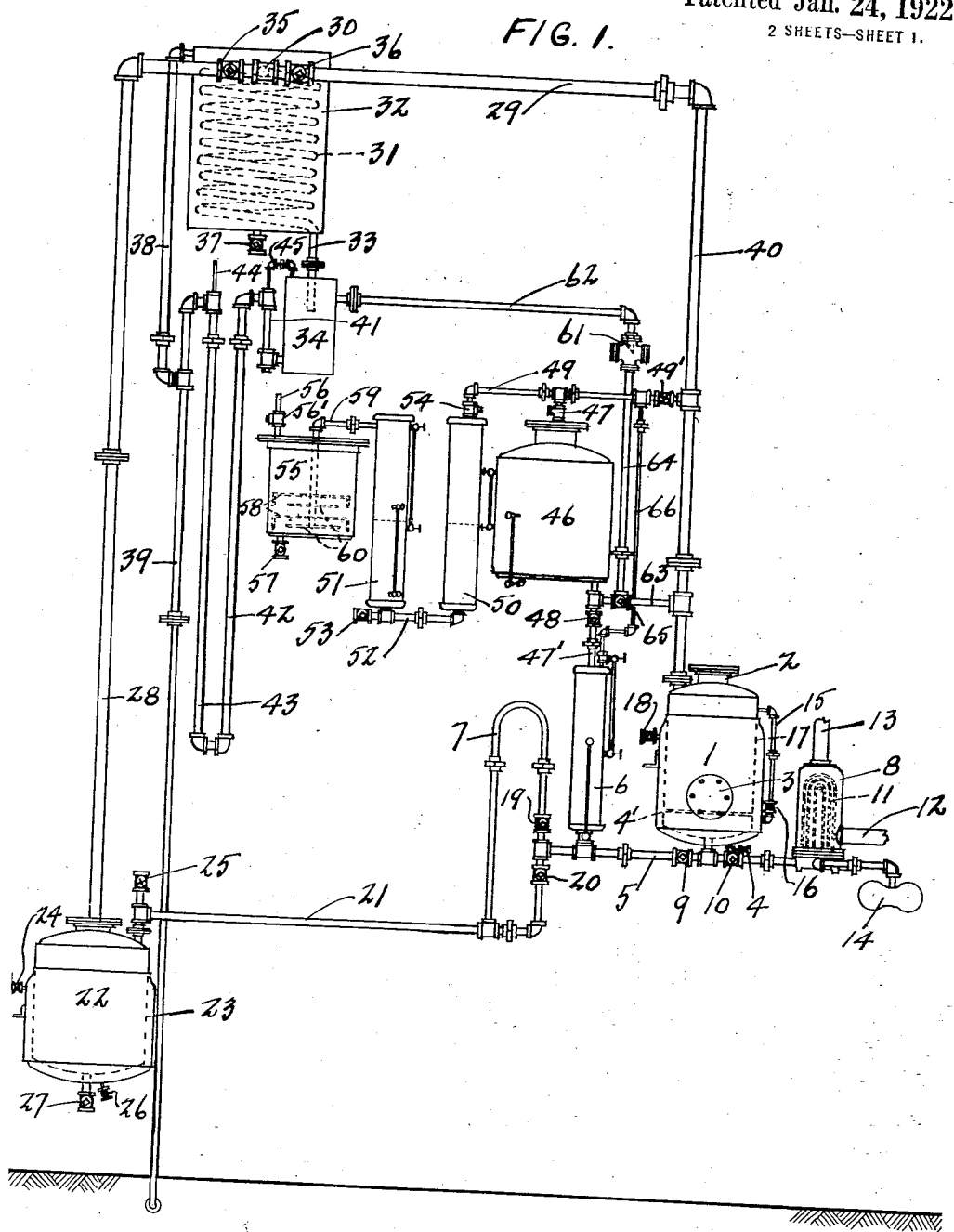
Fig. 1 is a front elevation of the new apparatus for extracting sulphur from oxides by my improved process.

Referring more particularly to the drawings which are more or less diagrammatic and which do not show supports for the various tanks and pipes connecting the same but which show the relative position of said tanks and pipes.

1 indicates an extractor tank adapted to hold the oxide from which the sulphur is to be extracted and which is provided with a charging opening 2 and a delivery opening 3 for respectively feeding the oxide to the extractor tank and removing it therefrom after the extraction has been completed, each of which openings is provided with a suitable removable closure or cover as illustrated. Extractor tank 1 is also provided with a suitable drip 4 for a steam jacket and with an inner false bottom 4' (preferably a wood grating covered with burlap) for receiving the oxide and preventing the fine particles thereof from passing into the piping system of the apparatus.

Tank 1 is connected at its bottom to pipe 5 which connects with the lower end of equalizer tank 6, siphon 7 and air heater 8 and the pipe is provided with cocks 9 and 10 between the tank 1 and tank 6 and siphon 7, and tank 1 and air heater 8, as illustrated. The air heater 8 is provided with the usual interior steam-pipes 11, the inlet air-pipe 12, the inlet steam-pipe 13 and exhaust steam-pipe (not shown) and the blower 14 for forcing the heated air through pipe 5 and up into tank 1 when cock 10 is opened and cock 9 is closed. The extractor tank 1 is also provided with a suitable air-pipe 15 connecting the upper and lower portions of said tank, said air-pipe having a suitable cock 16 therein. 17 indicates a steam jacket for the extractor tank and 18 a steam inlet connecting therewith.

Siphon 7 is supplied with cocks 19 and 20 and is connected by pipe 21 with still 22 as illustrated. Still 22 is provided with a suitable steam jacket 23, a steam inlet 24 connecting therewith, an air cock 25 to allow air to enter therein when so desired, a drip 26 to allow condensed water to flow therefrom and an outlet pipe 27 for removal of the sulphur extracted from the oxide.

Connected to the top of the still 22 is a pipe 28 connecting with a horizontal pipe 29 which is provided with an inlet valve 30 connecting with the coil 31 of the condenser 32, said coil 31 terminating in a short pipe 33 passing through the bottom of the condenser and entering the closed water-separator 34. The horizontal pipe 29 is provided, preferably, with two cocks 35 and 36, one on either side of the inlet valve 30. It is also provided with a water inlet 37 so that water may flow or be pumped in the condenser, and with a water overflow pipe 38 connecting with the condenser adjacent the top thereof and also connecting with a long main discharge or sewer pipe 39. The pipe 29 and the top of extractor tank 1 are connected together by a pipe 40.

Connected with water-separator 34 adjacent the bottom thereof is a short pipe 41 connected at its top with the counterbalancing pipes 42 and 43, pipe 43 being joined, as illustrated, with the discharge or sewer pipe 39 and provided at its upper end with an open pipe 44 so that the air therein is under atmospheric pressure. The top of the water-separator 34 and the top of short pipe 41 are joined together by a connection 45 so that the pressure in both is the same and so that syphoning of the liquid in 34 into the counterbalancing pipes will be prevented.

46 indicates my improved solvent tank adapted to hold the solvent which in the preferred form of my invention is benzol. Said tank is provided with a suitable inlet 47 as shown so that it may be readily filled with the solvent when so desired. 47' indicates a pipe connecting the top of equalizer tank 6 and the bottom of the solvent tank and it is provided with a cock 48. 49 indicates a pipe connecting together the pipe 40, the solvent tank 46 and one of two pressure regulating tanks 50 and 51 which are preferably of equal size, and said pipe 49 is provided with a suitable cock 49' adjacent pipe 40. The said pressure regulating tanks are joined together by pipe 52 provided with a drain 53 and tank 50 is provided with an inlet 54.

55 indicates a scrubber having an inlet pipe 56 with a suitable cock 56' therein, an outlet pipe 57 and preferably two perforated diaphragms 58 suitably supported therein. Said scrubber is connected with the pressure regulating tank 51 by a pipe 59 which extends downwardly through the scrubber and terminates adjacent the bottom thereof. 60 are perforated pipes within the scrubber connecting with pipe 59 and carried thereby.

61 is a sight box provided with glasses or lunettes at one or both sides thereof. Said sight box is connected with the water-separator 34 by a pipe 62 and with pipe 63 by a pipe 64. Pipe 63 connects pipes 40 and 47' and it is provided with a suitable three-way cock 65 therein. 66 indicates a pipe connecting together the tank 6 and pipe 49, this connection acting to keep the pressure constant in solvent tank 46, equalizer tank 6 and extractor tank 1 when the cocks in the pipes connecting these tanks are open. As illustrated, tank 6, solvent tank 46 and pressure regulating tank 51 are provided with suitable gauges so that the amount of liquid therein can be determined by visual inspection.

My improved process of extraction is as follows:

The extractor tank 1 is charged with oxide, the condenser 32 is filled with warm water, just cool enough for the purpose of distillation, the pressure regulating tanks 50 and 51 are about one-half filled with water, the scrubber 55 is filled with oil or water and the solvent tank 46 is filled with solvent which is preferably benzol. Assuming all the cocks in the system are closed, cocks 9, 49' and 48 are opened in the order named and the solvent in tank 46 is permitted to flow down through equalizer tank 6, through pipe 5 and up into the extractor tank 1 until the oxide therein is completely submerged, after which the cock 48 is closed and the solvent allowed to remain in the extractor tank 1 for about one hour during which time, by chemical action, it extracts a large amount of sulphur from the oxide. Cock 19 in siphon 7 is then opened and the solution of the benzol with sulphur siphons over into the still 22 through pipe 21. Cock 48 is then again opened and an additional quantity of the solvent is allowed to flow into the extractor tank until it is about one-third filled in order to provide enough excess to hold the sulphur in the still in solution. After the extractor is one-third filled, cock 48 is again closed and cock 20 in the siphon is opened to allow the additional solution to flow from the extractor through pipe 21 within the still.

After the first supply of solvent holding the sulphur in solution as well as the additional supply just referred to have flowed into the still, cock 20 is closed and cocks 16, 35 and 65 are opened and steam is forced into the steam jacket 23 of the still through the steam inlet 24 so as to distill the solvent. When the distillation begins the solvent vapor passes up through pipe 28 through the coils 31 of the condenser and then in liquid form through pipe 33 to water-separator 34. Benzol being lighter than water, it floats thereon in separator 34 until it reaches a certain level after which it flows, freed from water, through pipe 62 through the sight-box 61, through pipes 64, 63 and 40 and back into the extractor tank 1. The excess water which collects in water separator 34 flows through pipe 41, counterbalancing pipes 42 and 43 and then off through the discharge or sewer pipe 39. Instead of having the water in 34 drain off directly therefrom I have found it necessary to have it flow off from the water-separator through the system of pipes and in the manner just described in order to retain the necessary pressure in the system which I have found quite necessary to secure the best results and to properly practice my improved process.

After the distilled solvent flows down through pipes 62, 64, 63 and 40 and into extractor tank 1 it absorbs or extracts more sulphur from the oxide in the tank and then flows through pipe 5 and into tank 6. Tank 6, obviously, the first time, that is at the start of the process, merely serves as a connection between solvent tank 46 and extractor tank 1 but after the process has started and the distilled solvent flows from the extractor tank (with sulphur in solution) into the tank 6 the latter tank acts as a small reservoir for the saturated or partly saturated solution, that is the solvent saturated or partly saturated with sulphur extracted from the oxide. The said saturated or partly saturated solution flows out of the extractor tank through pipe 5 and up into tank 6 as fast as and so long as additional distilled solvent flows into the top of the extractor tank as is obvious. I have found in practice that the inclusion of the said tank 6 in the system is quite necessary to attain the greatest success in practicing the process. After extractor tank 1 and tank 6 have become sufficiently filled with solvent, the solvent with the extracted sulphur in solution again siphons over into the still 22 and the distillation of the solvent again takes place leaving the extracted sulphur in the still and the same steps are repeated automatically and continuously until the extraction process is complete, that is, that all the sulphur has been extracted from the oxide in the still.

When the distilled solvent has flowed back into the extractor tank 1 and after it has siphoned over into still 22, the space below the false bottom 4' of the extractor tank is filled with a mixture of air and solvent vapor and this mixture is also drawn into the oxide as the solvent runs out. Inasmuch as the extractor tank is filled from the top, after the first filling, in order to avoid the trapping of air and the forming of air pockets in the oxide, the pipe 15 on the side of the extractor tank has been provided to allow the air to flow freely between the bottom of the tank under the false bottom and the top thereof. The cock 16 on this pipe remains closed during the first filling but is opened after the distillation has begun.

When all the sulphur has been extracted from the oxide in extractor tank 1, the steam is turned off in jacket 23 and the distillation stopped. Cock 19 of the siphon 7 is then closed and cock 20 opened to permit all the solvent that is free in the extractor tank 1 to run direct into the still 22. After the extractor tank is drained of all its free solvent, cocks 35, 20, 9, 65, 16 and 49' are closed and cock 36 is opened.

The oxide in the extractor tank 1 still retains a large quantity of solvent and this is recovered preferably by admitting steam through the inlet 18 to the steam jacket 17 of the extractor tank, opening valve 10 and forcing a gentle current of the hot air of air heater 8 up through the extractor tank by means of the blower 14. Distillation of the solvent in the extractor tank then takes place inasmuch as the solvent vapor due to the heating of the solvent, is forced through pipes 40 and 29 through the coils 31 of condenser 32 and, in liquid form, into the water-separator 34 where it is freed from water as in the previous case, and then flows through pipe 62, sight-box 61, pipe 54 and up into the bottom of the solvent tank 46 which is made possible by opening the three-way cock 65 in such a manner as to permit communication between pipe 64 and the solvent tank but not between pipe 64 and the extractor tank 1. When the distillation is complete, that is when all the solvent is recovered from the extractor tank which can be determined by noting a cessation of flow of solvent through the sight-box 61, the steam valve 18 is turned off, as well as the blower 14, and cock 36 is closed. The oxide is then removed from discharge door 3.

While the cooling and removing of oxide from the extractor tank is taking place, the steam valve 24 is again opened as well as cock 35 and the remaining solvent in the still 22 is distilled, the distilled solvent finally flowing back up into solvent tank 46 in an obvious manner and as has heretofore been explained. After the distillation has been completed which is determined by the cessation of flow of solvent through sight-box 61, the heating of the still 22 is continued until the sulphur therein is melted, air cock 25 and cock 27 are opened and the melted sulphur is allowed to flow into any suitable container and to cool, after which it is broken up for shipment.

Before starting the process the various pipes and tanks of the system are of course filled with air but with the beginning of the distillation the system also becomes filled with solvent vapor which is apt to cause undue pressure in the system unless means are provided for the escape of air. Such means are provided in my improved device which prevent at the same time the loss of the solvent vapor and consists of the pressure regulator tanks 50 and 51 with the adjacent connecting scrubber 55. When the pressure in the system becomes unduly high the water in tank 50 is forced into tank 51 through pipe 52 and when tank 50 is empty the air collecting a part of the solvent vapor mixed therewith bubbles through the water and passes through pipe 59 and perforated pipes 58 into the bottom of scrubber 55. The oil in the scrubber retains or absorbs the solvent but the air passes up through the perforated diaphragms 58 and escapes through the pipe 56, the cock 56' therein remaining open. When the scrubber is sufficiently filled with solvent the oil with the solvent is drawn off through outlet pipe 57. The solvent may then be recovered from the oil by distillation of the mixture in any suitable still.

In the modification shown in Fig. 2, I have shown two condensers 70 and 71 having a common overflow pipe 72 connecting with the main discharge or sewer pipe 39 shown in the preferred form of the invention. The upper ends of the coils within the condensers 70 and 71 are connected with pipes 28 and 40 respectively, shown in Fig. 1, the lower ends of the coils being respectively connected with pipes 73 and 74 entering within water-separators 75 and 76, each water-separator having connected therewith a system of counterbalancing pipes 77 and 78 similar in construction to the counterbalancing system shown in Fig. 1. Both counterbalancing systems 77 and 78 connect (not shown) with the main discharge or sewer pipe 72. The water-separators 75 and 76 are connected with the sight-boxes 79 and 80 and said sight-boxes are joined together by a common pipe 81 which connects (not shown) with the main solvent tank 46. The principle of operation of the device of the modification is similar to the operation of the preferred form of the invention, but in the modification two condensers, water-separators and sight-boxes are employed, one system (condenser, water-separator and sight-box) being for the solvent vapor flowing from the still 22 and the other system for the solvent vapor flowing from the extractor tank 1. The device of the modification just described is therefore advantageous as a saver of time in that after the extraction process has been completed, the distillation and recovery of the solvent remaining in the still 22 and in the extractor tank 1 may be carried on simultaneously.

In the modification shown in Fig. 3 the connections of the pipe 62 and the counterbalancing pipes 42 and 43 with the water-separator 34 are shown reversed. This arrangement is employed when carbon bisulphide is used as a solvent, the pipe 41 with connection 45 being joined to pipe 62 (leading to sight-box 61) instead of being joined to counterbalancing pipe 42 as in the preferred form of the invention, and counterbalancing pipe 42 is joined to the water-separator adjacent its top instead of adjacent its bottom as in the preferred form. These connections are reversed for the reason that carbon bisulphide is heavier than water and in consequence the water in the water-separator rises to the top thereof and the carbon bisulphide sinks to the bottom.

Fig. 4 shows the extractor tank 1 provided with a suitable steam pipe 90, with a cock 91, entering up through the bottom of the tank. After the extraction is completed I recover the solvent remaining in the extractor tank by blowing live steam from said pipe 90 up through the false bottom 4' of the tank instead of in the manner previously described. This carries off the solvent partly by heating and partly by the mechanical action of the current of steam. The mixture of the steam and solvent vapor passes up through the condenser and the solvent is recovered as in the previous case. During the heating a considerable quantity of the steam becomes condensed in the extractor tank and this may be removed through pipe 90 by opening cock 91. The extractor tank is then filled with cold water to cool it after which the water as allowed to run off and the oxide is then removed from the discharge door.

It will be apparent from the foregoing description that by my improved apparatus and process I am able to effectively and quickly extract the sulphur from the oxide with scarcely any loss of the solvent.

What I claim as my invention is:—

1. The herein described process of extracting sulphur from a substance with which it is mixed consisting in treating the substance with benzol, drawing off the solution containing the benzol and the sulphur extracted from the substance and separating the benzol from the sulphur.

2. The herein described process of extracting sulphur from a substance with which it is mixed consisting in treating the substance with a solvent by permitting the solvent to flow upwardly therethrough, drawing off the solution containing the solvent and the sulphur extracted from the substance, heating said solution to drive off the solvent by distillation and leave the sulphur free and permitting the distilled solvent to flow downwardly through the substance to extract additional sulphur therefrom.

3. The herein described process of extracting sulphur from a substance with which it is mixed consisting in submerging the substance with a solvent in an extractor tank, permitting the solution containing the solvent and the sulphur extracted from the oxide to flow into a still, heating the solution within said still and separating the solvent therefrom by distillation to leave the sulphur free, permitting the distilled solvent to flow back by gravity through the substance and then to flow automatically to the still immediately after a predetermined amount thereof sufficient to submerge the substance has accumulated in the extractor tank and permitting the same cycle of operations to continue until the extraction of the sulphur from the substance has been completed.

4. The herein described process of extracting sulphur from a substance with which it is mixed consisting in treating the substance with a solvent in an extractor tank by permitting the solvent to flow up through the bottom of the tank, permitting the solution containing the solvent and the sulphur extracted from the substance to flow into a still, heating the solution within the still and separating the solvent therefrom by distillation to leave the sulphur free and permitting the distilled solvent to flow back into the top of the extractor tank and through the substance and to automatically siphon over into the still after the substance in the extractor tank has become submerged therein.

5. The herein described process of extracting sulphur from a substance with which it is mixed consisting in treating the substance with a solvent, permitting the solution containing the solvent and the sulphur extracted from the substance to flow into a still, distilling the solvent from the solution within the still and leaving the sulphur free and heating the free sulphur in the still to draw off the same from the still in liquid form.

6. The herein described process of extracting sulphur from a substance with which it is mixed consisting in treating the substance with a solvent, permitting the solution containing the solvent and the sulphur extracted from the substance to flow into a still, heating the still and separating the solvent from the solution by distillation to leave the sulphur free and continuing the heating of the still after distillation of the solvent to melt the free sulphur and to permit it to be drawn off from the still in liquid form.

7. The herein described process of extracting sulphur from a substance with which it mixed consisting in treating the substance with a solvent in an extractor tank, permitting the solution containing the solvent and the sulphur extracted from the substance to flow into a still, distilling the solvent from the solution in the still, permitting the distilled solvent to flow through the substance and then, when partly saturated with sulphur, into an equalizer tank, allowing the distilled solvent partly saturated with sulphur to automatically siphon over into the still from the extractor tank and equalizer tank and repeating the same cycle of operations until the extraction of the sulphur from the substance has been completed.

8. The herein described process of extracting sulphur from a substance with which it is mixed consisting in treating the substance with a solvent in an extractor tank, permitting the solution containing the solvent and the sulphur extracted from the substance to flow into a still, heating said still and distilling the solvent from the solution therein, permitting the distilled solvent to flow back through the substance in the extractor tank and then, when partly saturated with sulphur, into an equalizer tank, allowing the distilled solvent partly saturated with sulphur extracted from the substance to automatically siphon over into the still from the extractor tank and equalizer tank after a predetermined amount has flowed therein and permitting the same cycle of operations to automatically repeat themselves until the extraction of the sulphur from the substance has been completed.

9. The herein described process of extracting sulphur from a substance with which it is mixed consisting in treating the substance with a solvent in an extractor tank, permitting the solution containing the solvent and the sulphur extracted from the substance to flow into a still, separating the solvent from the solution in the still, permitting the separated solvent to flow through the substance and then, when partly saturated with sulphur, to an equalizer tank, allowing the partly saturated solution to again flow into the still and separating the solvent from the solution in the still to leave the sulphur free.

10. The herein described process of extracting sulphur from a substance with which it is mixed consisting in treating the substance with a solvent in an extractor tank, drawing off the solution containing the solvent and the sulphur extracted from the substance, separating and recovering the solvent from the sulphur and recovering the residue of solvent in the extractor tank by forcing hot air up through the bottom of the tank and distilling the solvent therein.

11. The herein described process of extracting sulphur from a substance with which it is mixed consisting in treating the substance with a solvent by permitting the solvent to flow upwardly therethrough, drawing off the solution containing the solvent and the sulphur extracted from the substance, distilling the solvent from the solution, separating the water from the distilled solvent, permitting the distilled solvent to flow back by gravity downwardly through the substance to extract more sulphur therefrom and repeating the same cycle of operations until the extraction process is completed.

12. The herein described process of extracting sulphur from a substance with which it is mixed consisting in treating the substance with a solvent in a suitable extractor tank by permitting the solvent to flow up through the bottom of the tank, permitting the solution containing the solvent and the sulphur extracted from the substance to flow into a still, heating said still and distilling the solvent from the solution, separating the water from the distilled solvent, permitting the distilled solvent to flow back into the solvent tank and through the substance to extract more sulphur therefrom, allowing the solution containing the distilled solvent and sulphur extracted from the substance to siphon over into the still after a predetermined amount of the distilled solvent has flowed into the extractor tank and automatically repeating the same cycle of operations until all the sulphur has been extracted from the substance.

13. The herein described process of extracting sulphur from a substance with which it is mixed consisting in treating the substance with a solvent in an extractor tank by permitting the solvent to flow upwardly therethrough, permitting the solution containing the solvent and the sulphur extracted from the substance to flow into a still, separating the solvent from the solution, permitting the separated solvent to flow back downwardly through the extractor tank and the substance to extract more sulphur therefrom, permitting the same cycle of operations to continue automatically until the extraction process is completed and recovering the residue of solvent in the still and the extractor tank by heating said still and extractor tank and condensing the solvent vapor flowing therefrom.

14. The herein described process of extracting sulphur from a substance with which it is mixed consisting in treating the substance with a solvent in an extractor tank, permitting the solution containing the solvent and the sulphur extracted from the substance to flow from the extractor tank, separating the solvent from the solution, and recovering the solvent remaining in the extractor tank by heating the tank, forcing hot air up through the bottom of the tank and distilling the solvent therein.

15. The herein described process of extracting sulphur from a substance with which it is mixed consisting in treating the substance with a solvent in an extractor tank, permitting the solution containing the solvent and the sulphur extracted from the substance to flow from the extractor tank, separating the solvent from the solution to leave the sulphur free and recovering the solvent remaining in the extractor tank, forcing live steam up therethrough and distilling the solvent therein.

16. An apparatus for extracting sulphur from a substance with which it is mixed comprising an extractor tank adapted to hold the substance and to receive solvent therein, a still connected with the extractor tank and adapted to receive the solution containing the solvent and the sulphur extracted from the substance, a condenser connected with the extractor tank and the still for condensing solvent vapor arising therefrom, a water-separator for separating the distilled solvent from water and connected with said extractor tank to permit the distilled solvent to flow back therethrough, counter-balancing pipes connected together and one of which is connected to the top and bottom of said water-separator and a discharge pipe connected to the other of said counter-balancing pipes.

17. An apparatus for extracting sulphur from a substance with which it is mixed comprising an extractor tank adapted to hold the substance and to receive solvent therein, a solvent tank, a still adapted to receive the solution containing the solvent and the sulphur extracted from the substance, a syphon for permitting the syphoning of the solution from the extractor tank into the still, and connected to the bottom of said ertractor tank and to said solvent tank, means for heating said still to drive off the solvent from the solution in vapor form, a condenser connected with the still for condensing the solvent vapor and a connection between said condenser and said extractor tank for permitting the condensed solvent to flow from the condenser into the top of said extractor tank or into said solvent tank as desired.

18. An apparatus for extracting sulphur from a substance with which it is mixed comprising an extractor tank adapted to hold the substance and to receive solvent therein, an equalizer tank connected with said extractor tank and adapted to receive the solvent with sulphur in solution from the extractor tank, a still connected with said equalizer tank, means permitting the syphoning of the solution from the equalizer tank into the still and a condenser connected with said still and said extractor tank for condensing solvent vapor arising therefrom.

19. An apparatus for extracting sulphur from a substance with which it is mixed comprising an extractor tank adapted to hold the substance and to receive solvent therein, a still connected with said extractor tank and adapted to receive a solution containing the solvent and the extracted sulphur, means for distilling the solvent from the solution, means permitting the distilled solvent to flow back by gravity into the extractor tank and means permiting the escape of air from the apparatus without loss of the solvent and comprising a closed tank holding a liquid and connected to said extractor tank and a scrubber holding a liquid and connected to said closed tank.

20. An apparatus for extracting sulphur from a substance with which it is mixed comprising an extractor tank adapted to hold the substance and to receive solvent therein, a still connected with said extractor tank and adapted to receive a solution of the solvent with extracted sulphur from said extractor tank, means for heating said still to drive the solvent from the solution in vapor form, a condenser for distilling said solvent vapor and connected with said extractor and means permitting the escape of the air from the apparatus and comprising closed pressure regulator tanks connected together and partly filled with water and a scrubber filled with a liquid and connecting with said pressure regulator tanks, said scrubber being adapted to retain solvent vapor therein and to permit air to flow therefrom.

21. An apparatus for extracting sulphur from a substance with which it is mixed comprising a solvent tank, an extractor tank connected with said solvent tank and adapted to hold the substance and to receive solvent from the solvent tank, a still, means permitting syphoning of a solution containing the solvent and extracted sulphur from the extractor tank and equalizer tank over into the still, means for distilling the solvent vapor flowing from the still when said still is heated, and means connecting said distilling means and said extractor tank and solvent tank to permit the distilled solvent to flow back into either one of them as desired.

22. An apparatus for extracting sulphur from a substance with which it is mixed comprising an extractor tank for holding the substance and adapted to receive a solvent therein, a still adapted to receive a solution of the solvent with extracted sulphur from the extractor tank, a condenser connected with said still for distilling the solvent vapor flowing from the still when the solution therein is heated a water-separator connected with said condenser for separating the water from the distilled solvent, means for permitting the separated water to flow from the water-separator without loss of pressure in the apparatus and connecting means between said water-separator and said extractor tank to permit the distilled solvent to flow back into the extractor tank.

23. An apparatus for extracting sulphur from a substance with which it is mixed comprising a solvent tank, an extractor tank adapted to hold the substance and to receive solvent from the solvent tank for the purpose of extraction of the sulphur, a still connected with said extractor tank and adapted to receive the solution of solvent with the extracted sulphur from the extractor tank, a condenser connected with said still for distilling the solvent vapor flowing from the solution when the same is heated, a water-separator connected with said condenser for separating the water from the distilled solvent, a pipe connecting said water-separator and said solvent tank and extractor tank to permit the distilled solvent to flow into either the solvent tank or extractor tank as desired and a sight-glass in said pipe permitting the visual inspection of solvent flowing therethrough.

24. An apparatus for extracting sulphur from a substance with which it is mixed comprising an extractor tank having a false bottom adapted to hold the substance, said tank being adapted to receive a solvent, a still connected with said extractor tank for receiving the solution of the solvent and sulphur, means for separating the solvent from the solution to leave the sulphur free, means permitting the separated solvent to flow back into the extractor tank and an air pipe connecting the top of the extractor tank and the bottom thereof under the false bottom to prevent trapping of air and forming of air pockets in the substance when the separated solvent flows in the extractor tank.

25. An apparatus for extracting sulphur from a substance with which it is mixed comprising an extractor tank adapted to hold the substance and to receive solvent therein, means for heating said extractor tank, a condenser connected with said extractor tank, an air heater also connected therewith and a blower connected with the air heater whereby said extractor tank may be heated and hot air forced up through the bottom thereof to heat the solvent remaining in the extractor tank after the extraction has been completed and to drive the solvent vapor through the condenser to condense the same.

26. An apparatus for extracting sulphur from a substance with which it is mixed comprising an extractor tank adapted to hold the substance, a solvent tank connected with said extractor tank, a condenser connected with said extractor tank and said solvent tank, a steam pipe also connected with the extractor tank whereby the solvent vapor, after completion of the extraction, may be forced out of the extractor tank and through the condenser to condense said solvent vapor by forcing live steam through said steam pipe up through the bottom of the extractor tank and a sight glass whereby it may be determined when the condensing of the solvent vapor has been completed.

Signed at New York, in the County of New York and State of New York, this 25th day of September A. D. 1918.

ARTHUR GIVEN.

Witnesses:
F. B. TOWNSEND,
IRENE LEFKOWITZ.